US005525006A

United States Patent [19]
Kilman et al.

[11] Patent Number: 5,525,006
[45] Date of Patent: Jun. 11, 1996

[54] FLUSH MOUNT WELL PROTECTOR

[75] Inventors: John Kilman, deceased, late of Stone Mountain, by Mary H. Kilman, William Dickson, executors; Phillip L. Myers, Lithonia, both of Ga.

[73] Assignee: Kilman Electriloc Inc., Stone Mtn., Ga.

[21] Appl. No.: 369,141

[22] Filed: Jan. 5, 1995

[51] Int. Cl.⁶ .................... E02D 29/12; E02D 29/14
[52] U.S. Cl. .................... 404/25; 404/26; 52/20
[58] Field of Search .............. 404/25, 26; 52/20, 52/19

[56] References Cited

U.S. PATENT DOCUMENTS

| | | | |
|---|---|---|---|
| 428,247 | 5/1890 | Fenner . | |
| 1,639,495 | 8/1927 | Frame | 52/20 |
| 3,578,027 | 5/1971 | Zopfi | 138/89 |
| 3,584,485 | 6/1971 | Peterson | 70/276 |
| 3,629,981 | 12/1971 | McCaffery | 404/26 X |
| 3,782,147 | 1/1974 | Hallmann | 70/276 |
| 3,974,599 | 8/1976 | Grosh | 52/20 |
| 4,075,796 | 2/1978 | Cuozzo | 404/26 X |
| 4,223,799 | 9/1980 | Eyster | 220/230 |
| 4,334,578 | 6/1982 | Labrum | 166/75 |
| 4,499,695 | 2/1985 | Oger et al. | 404/25 X |
| 4,881,597 | 11/1989 | Hensley | 166/92 |
| 4,971,149 | 11/1990 | Roberts | 166/92 |
| 5,010,957 | 4/1991 | Kenner | 166/379 |
| 5,063,996 | 11/1991 | Kenner | 166/75.1 |
| 5,195,590 | 3/1993 | Kenner | 166/379 |

*Primary Examiner*—Ramon S. Britts
*Assistant Examiner*—James A. Lischora
*Attorney, Agent, or Firm*—Jones & Askew

[57] ABSTRACT

The invention is a monitoring well cover with a generally planar lid, a generally cylindrical rim, and one or more generally cylindrical skirts. The lid has threads on its side to secure the lid to the rim. The rim has an L-shaped upper edge for receiving and sealing tightly with the lid and has snaps positioned around its lower edge for receiving and sealing tightly with one of the skirts. The skirts each having flanges positioned around their upper ends and snaps positioned around their lower ends such that the first of the skirts may seal tightly with the rim and each subsequent skirt may seal tightly with the skirt preceding it. The lid, the rim, and the skirt are all constructed from a fiber reinforced, heat stabilized, high strength thermoplastic.

13 Claims, 3 Drawing Sheets

FLUSH MOUNT WELL PROTECTOR

RELATED APPLICATIONS

Application Ser. No. 08/329,976, entitled "Key and Bolt Lock Device," filed Oct. 27, 1994, assigned to Kilman Electriloc, Inc., the assignee of the present application, is attached hereto as Appendix A. Application Ser. No. 08/329,976 discloses the preferred lock system of the present invention and is incorporated herein by reference. If Application Ser. No. 08/329,976 is allowed, then Appendix A will be canceled and reference to the allowed application will be substituted as provided by MPEP 608.01(p)B. If Application Ser. No. 08/329,976 is not allowed or is abandoned, then Appendix A will be incorporated into the specification of this application by amendment to satisfy the best mode requirement of this application.

1. Technical Field

The present invention relates generally to well equipment and more specifically to a noncorroding, nonsparking well cover unit for protecting a well from intrusion by external contaminates.

2. Background of the Invention

Underground storage tanks are used to hold any number of different chemicals and other substances. One of the more common uses of underground storage tanks is to store gasoline or other petrochemicals. Gasoline and other chemicals can cause significant damage if released into the ground water and the environment. Consequently, one or more monitoring wells are typically used in connection with each underground storage tank. These monitoring wells are placed in close proximity to the underground storage tanks so that ground water samples from the wells can determine if the storage tanks are leaking. The monitoring wells must be protected from contamination by surface or run-off water to provide for accurate testing of the ground water.

In the past, well covers were manufactured primarily from metal or metal alloys. Consequently, these well covers were relatively heavy and tended to rust after being exposed to the environment for an extended period of time. Exposure to chemicals could also affect the integrity of the covers.

It is also important that the well cover extend downward into the ground below the frost line to protect the well from being contaminated by outside sources. Many well covers accomplish this by using a fixed skirt extension from the well cover down into the well. These skirts are not adjustable and, therefore, typically cannot be adapted for different or changing frost lines.

Further, locking mechanisms have been provided on many well monitoring covers in an attempt to limit access to the well by unauthorized persons and preserve the integrity of the well. Many of these devices were relatively simple mechanical locks. More modern devices, such as the electronic locking bolt and key disclosed in co-pending and co-owned application Ser. No. 08/329,976, entitled "Key and Bolt Lock Device," can provide security and a means to transmit data on the conditions of the well.

Therefore, there is a need in the art for a monitoring well cover that prevents contamination of the well from outside sources, that is lightweight, that is not susceptible to rusting when exposed to the environment, that provides a locking device so as to prevent tampering with the well by unauthorized individuals, and that provides an adjustable skirt to adapt to varying frost line depths.

SUMMARY OF THE INVENTION

Stated generally, the invention is a monitoring well cover with a generally planar lid, a generally cylindrical rim, and one or more generally cylindrical skirts. The lid has threads on its side to secure the lid to the rim. The rim has an L-shaped upper edge for receiving and sealing tightly with the lid and has snaps positioned around its lower edge for receiving and sealing tightly with one of the skirts. The skirts each having flanges positioned around their upper ends and snaps positioned around their lower ends such that the first of the skirts may seal tightly with the rim and each subsequent skirt may seal tightly with the skirt preceding it. The lid, the rim, and the skirt are all constructed from a fiber reinforced, heat stabilized, high strength thermoplastic.

Specific embodiments of the invention include the use of a nylon polymer composite to construct the lid, the rim, and the sleeves. This use of this material results in a light-weight, high strength well cover. There is little need for maintenance because the color is molded into the material, eliminating the need for painting. Further, the material is noncorrosive and nonsparking, such that the well cover can be used in any environment.

The well cover may employ the use of a locking device to prevent unauthorized access. Further, the well cover may employ the use of one or more skirts to extend the well cover as far as necessary into the well. The well cover is therefore adjustable to adapt to the local frost line to ensure an adequate seal.

It is therefore an object of the present invention to provide an improved well protector.

It is another object of the present invention to provide for an adjustable well protector.

It is a further object of the present invention to provide a well protector that can be secured.

It is a still further object of the present invention to provide a well protector that is noncorrosive and nonsparking.

It is another object of the present invention to provide a well protector that needs little maintenance.

Other objects, features and advantages of the present invention will become apparent from the following detailed description, drawings, and claims.

DETAILED DESCRIPTION OF THE PREFERRED EMBODIMENT

Figure 1:
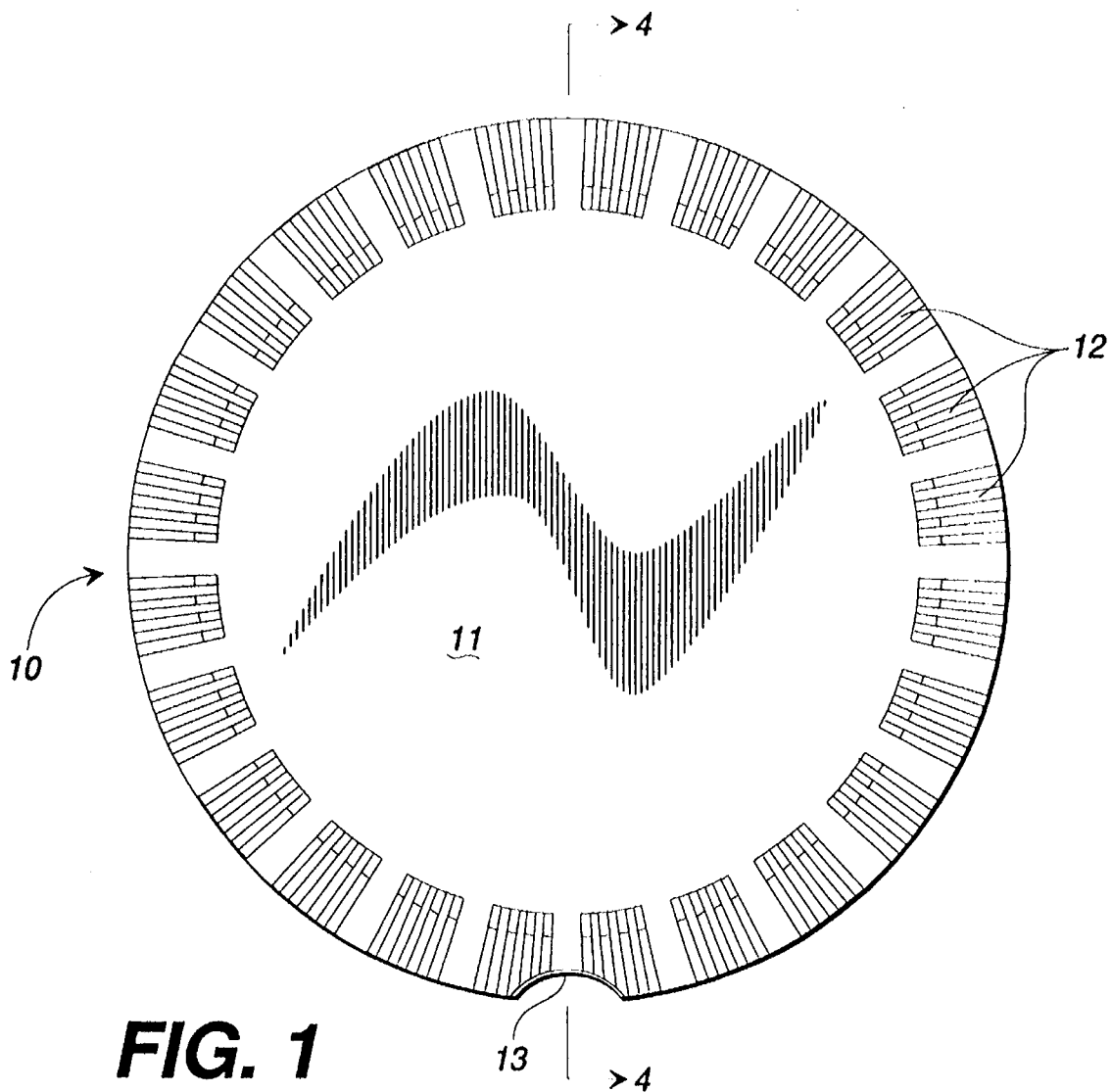
FIG. 1 is a top plan view of the lid.

Turning next to the drawing figures in which like numerals reference like parts, a preferred embodiment of the invention will now be described. The invention is a well protector that mounts into a well in an essentially flush fashion. FIGS. 1–4 show the improved well lid 10. FIG. 1 is a top plan view of the lid 10. The lid 10 is sized to the dimensions of the well and is generally planar in shape. The lid 10 has a top circular plate 11 with a plurality of ridges 12 positioned around the perimeter. The ridges 12 are used to assist with the placement and remove of the lid 10 into a rim 20 of a well head (not shown). The ridges 12 are intended to receive a tool to spin the lid 10 either into or out of the rim 20. The lid 10 also has a semicircular indentation 13 located on one end. This indentation 13 may be used for a locking device 30 that locks the lid 10 to the rim 20.

The preferred locking device 30 is similar to that disclosed in co-pending, co-owned application Ser. No. 08/329,976, entitled "Key and Bolt Lock Device," which is incorporated herein. Accommodation for a locking device is provided via the semicircular indentation 13 because it is typically desirable to restrict access to the monitoring well to authorized persons. While the preferred embodiment of the locking device 30 is disclosed in terms of the device disclosed in the co-pending application, any conventional type of locking mechanism may be employed.

Figure 2:
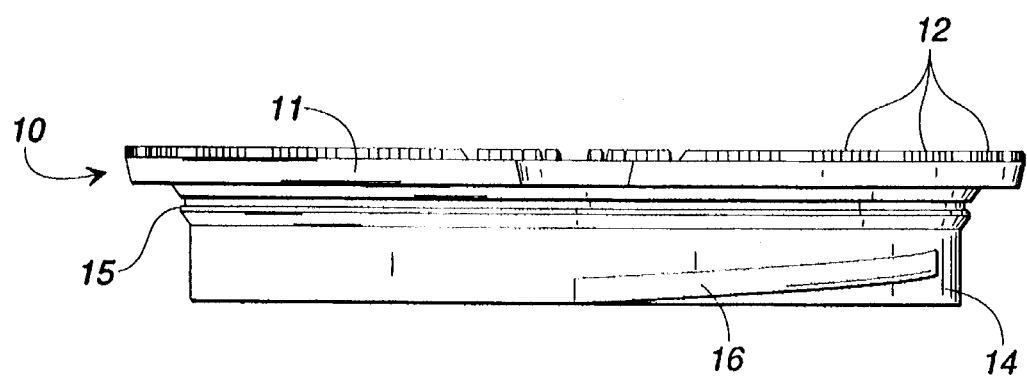
FIG. 2 is a side elevation view of the lid.

FIG. 2 shows a side elevation view of the lid 10. The lid 10 is designed to form a water tight seal with the rim 20. The top plate 11 of the lid 10 extends downward to a circular flange 14. The circular flange 14 is of narrower cross section than the top plate 11 so as to prevent the intrusion of contaminates from the environment. The lid has a sealing channel 15 to mate with the rim 20. Also shown is a threaded channel 16 that is used to insert the lid 10 into the rim 20. The threaded channel 16 allows the lid 10 to seal tightly with the rim 20.

Figure 3:
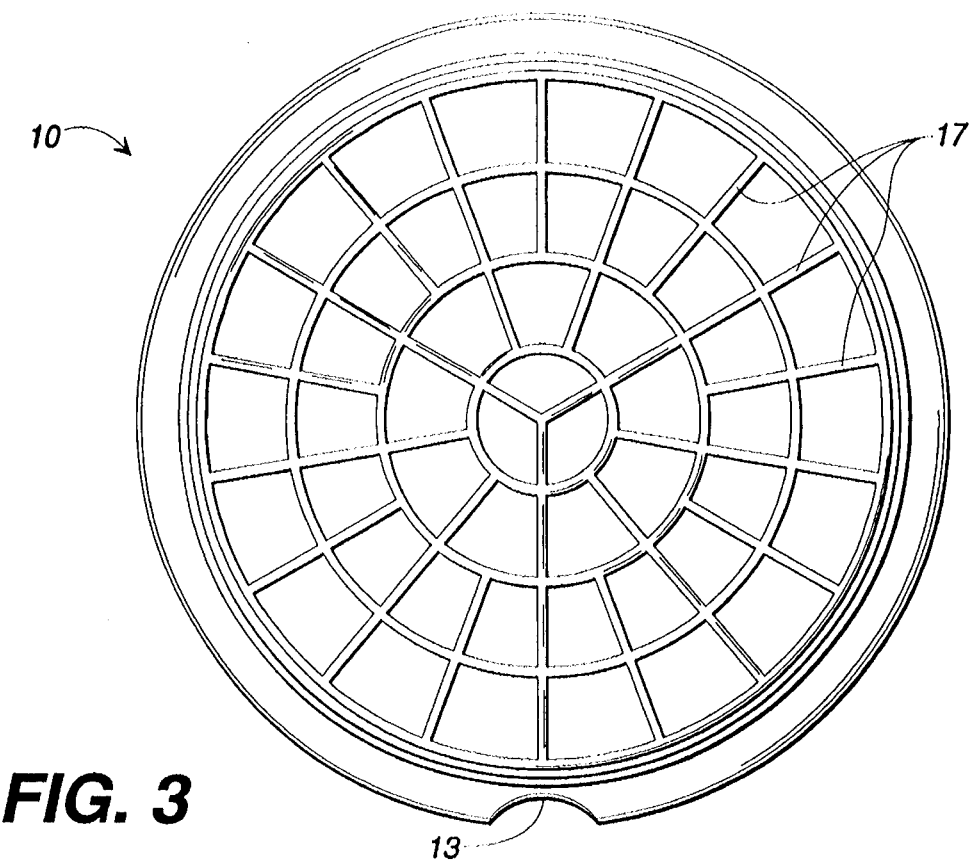
FIG. 3 is a bottom plan view of the lid.

FIG. 3 shows a bottom plan view of the lid 10. There is a number of extended ribs 17 located on the bottom of the lid 10. These ribs 17 are extended from the planar surface of the lid and provide additional structural support.

Figure 4:
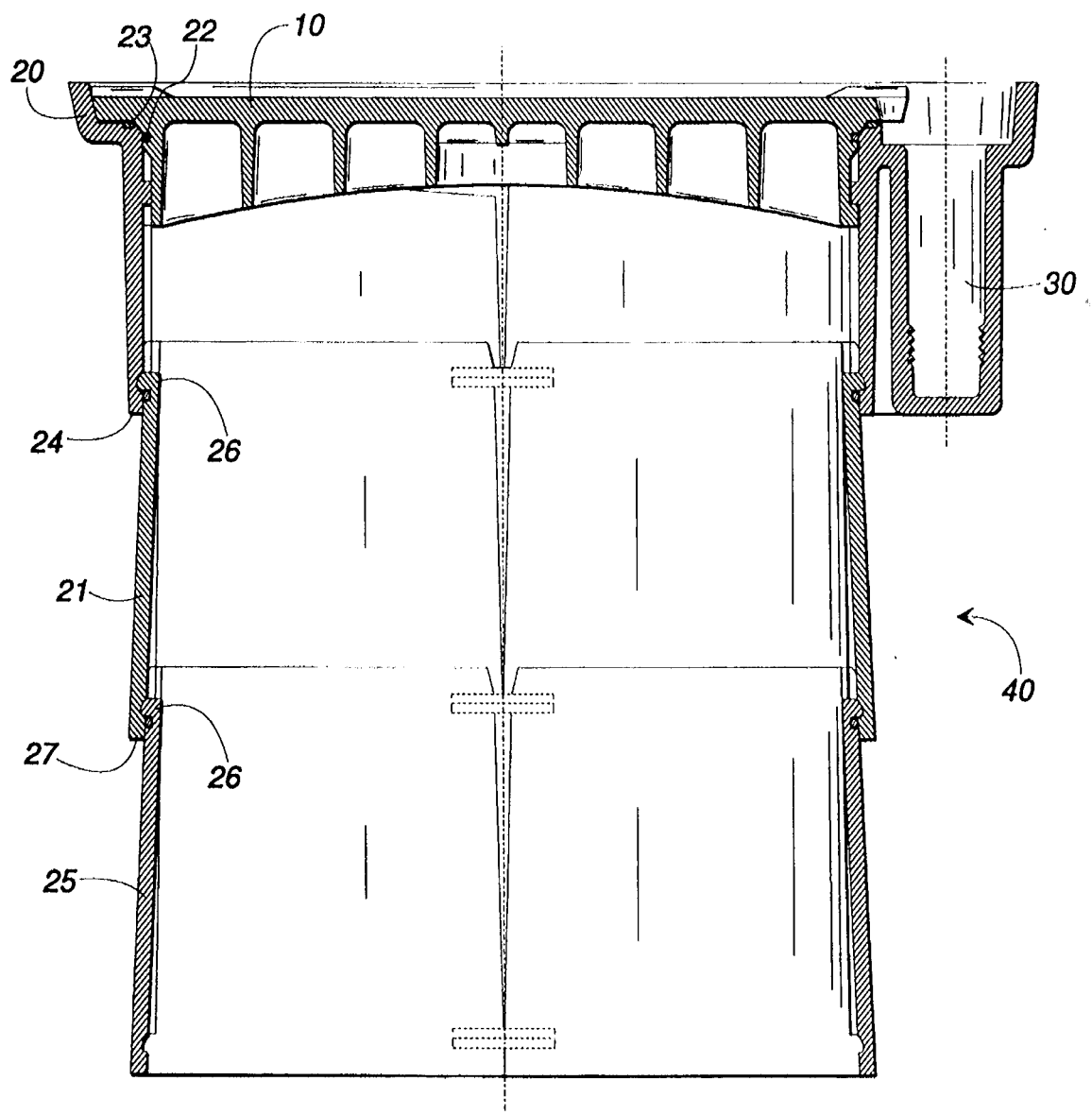
FIG. 4 is a side cross sectional view of a well monitoring cover unit with the lid and the rim with a skirt, taken along line 4—4 of FIG. 1.

FIG. 4 is a side cross sectional view of a well monitoring cover unit 40 with the lid 10 and the rim 20 with a skirt 21, taken along line 4—4 of FIG. 1. The rim 20 is L-shaped near the top to allow for insertion of the lid 10. As described above, the lid 10 is screwed into the rim 20 to form a water-tight seal. In addition to the structure of the lid 10, this seal is formed by an O-ring 22 located on the edge of the lid 10. An alternative embodiment may also include a second O-ring 23 for back-up sealing protection on the face of the rim 20. The rim 20 is approximately four inches in height.

The rim 20 is adapted with snaps 24 such that the skirt 21 can be attached as an extension to the rim 20. The skirt 21 is preferably approximately four inches in length and attaches to the rim 20 in a water tight seal. Each skirt 21 has one or more flanges 26 located along its top end for mating with the snaps 24 of the rim 20. The skirts 21 further have their own set of snaps 27. Because different geographical areas have different frost lines, the skirts 21 are designed such that they can be snapped to each other and form a water tight seal via flanges 26 and snaps 27. Therefore, the height of the rim 20 can be extended using additional skirts 25 that can be snapped together. In colder climates, it will be desirable to use one or more of the additional skirts 25 so that the monitoring well cover extends below the frost line. If the well cover does not extend below the frost line, there is a greater possibility that the well could become contaminated.

Figure 5:
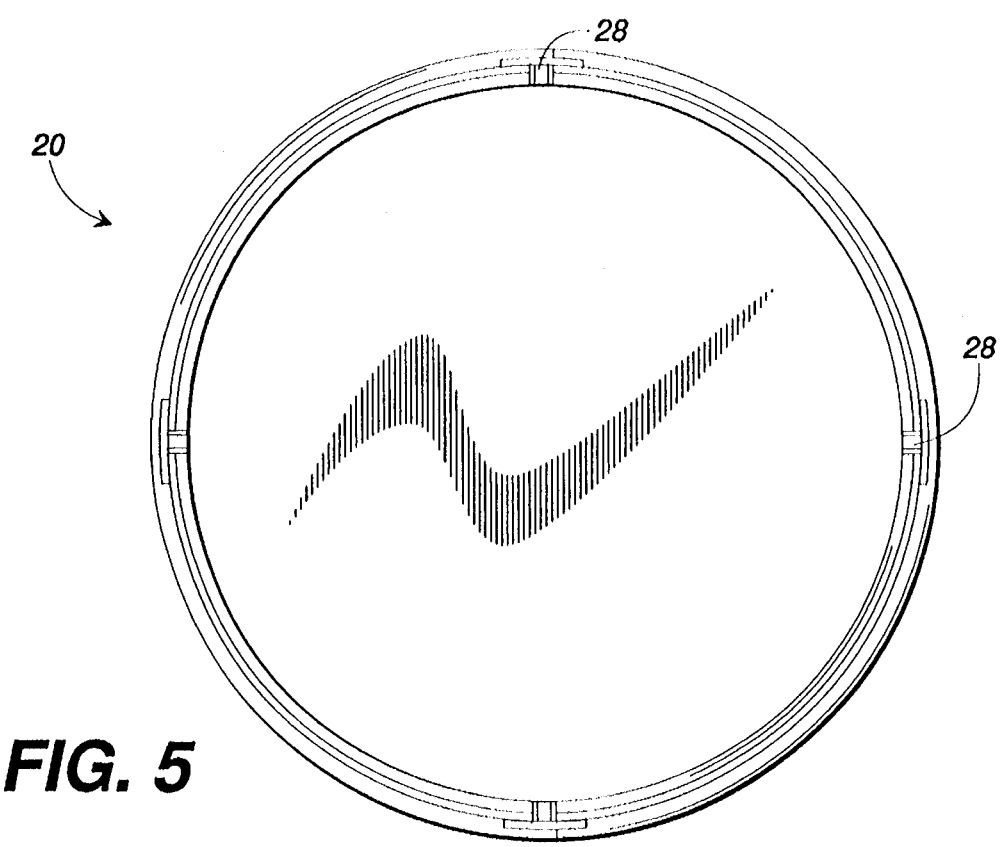
FIG. 5 is a top plan view of the rim.

FIG. 5 is a top plan view of the rim 20. The rim 20 may be positioned either directly in the ground or in concrete. On or more tabs 28 may be attached to the outside of the rim 20 and extend into the ground or the concrete to anchor the rim 20.

The lid 10, as well as the rim 20, are preferably constructed using a ceramic and glass fiber reinforced, heat stabilized, high strength thermoplastic material, such as Esbrid thermoplastic molding composites made by Thermofil of Brighton, Minn. Specifically, a ceramic fiber and glass fiber reinforced nylon composite is used. This material has several advantages over cast iron or aluminum, which have been used as materials in monitoring well covers in the past. The thermoplastic material used in the present invention is significantly lighter, but with approximately equal strength, as compared to monitoring well covers made from cast iron or aluminum. The material will neither oxidize like aluminum nor rust like iron. The material is resistant to hydrocarbons and other chemicals often present at a job site.

Additionally, because the lid 10 and rim 20 of the present invention is non-corrosive and the color is molded into the material, there is no need to paint the lid or rim as is typically done with other monitoring well covers. Information or warnings such as "CAUTION" or "DANGER" can be printed or molded into a separate piece of material and welded to the top plate 11.

Further, a well monitoring cover unit 40, employing the lid 10, the rim 20 and the locking device 30, is incapable of producing a spark. Because many monitoring well covers are operated in close proximity to flammable chemicals, this provides an additional advantage to the present invention.

In operation, the lid 10, when in a closed position, forms a water tight seal with the rim 20 by the O-ring 22. The lid 10 is locked to the rim 20 using a locking device 30 to prevent unauthorized persons from gaining access to the well. When the locking device 30 is unlocked, the lid 10 can be twisted off of the rim 20 and separated completely from the rim 20.

Accordingly, there has been provided a monitoring well cover that protects the well from above-ground contaminants. While the invention has been described in conjunction with specific embodiments thereof, it is evident that many alternatives, modifications, and variations will be apparent to those skilled in the art. The invention is intended to embrace all such alternatives, modifications, and variations as fall within the spirit and broad scope of the following claims.

I claim:

1. A monitoring well cover, comprising:

a generally planar lid;

a generally cylindrical rim;

one or more generally cylindrical skirts;

said lid having threads on its side to secure said lid to said rim;

said rim having an L-shaped upper edge for receiving and sealing tightly with said lid and snaps positioned around its lower edge for receiving and sealing tightly with one of said skirts;

one or more skirts each having flanges positioned around their upper ends and snaps positioned around their lower ends such that the first of said skirts may seal tightly with said rim and each subsequent skirt may seal tightly with the skirt preceding it; and said lid, said rim, and said skirts being constructed from a fiber reinforced, heat stabilized, high strength thermoplastic.

2. The monitoring well cover of claim 1, further comprising means to lock said lid to said rim.

3. The monitoring well cover of claim 1, wherein the bottom of said lid further comprises ribs to provide structural support to said lid.

4. The monitoring well cover of claim 1, wherein said lid further comprises grooves on its top to assist in twisting said lid off of said rim.

5. The monitoring well cover of claim 1, wherein said fiber reinforced, heat stabilized, high strength thermoplastic is incapable of creating a spark.

6. The monitoring well cover of claim 1, wherein said fiber reinforced, heat stabilized, high strength thermoplastic does not need to be painted.

7. The monitoring well cover of claim 1, wherein said generally cylindrical rim further comprises tabs extending from said rim for anchoring said rim in the ground.

8. The monitoring well cover of claim 1, wherein said fiber reinforced, heat stabilized, high strength thermoplastic is a ceramic and glass fiber reinforced nylon composite.

9. The monitoring well cover of claim 1 wherein said rim further comprises one or more O-rings to form a watertight seal between said rim and said lid.

10. A monitoring well cover comprising:

a generally plainer lid;

a generally cylindrical rim:

said rim comprising one or more snaps positioned around its lower edge a plurality of generally cylindrical skirts;

each of said plurality of said skirts comprising one or more flanges positioned around its upper end and one or more snaps positioned around its lower end;

said one or more flanges of a first one of said plurality of skirts being matingly engageable with said one or more snaps of said rim;

said one or more flanges of a second one of said plurality of said skirts being matingly engageable with said one or more snaps of said first one of said skirts; and said lid, said rim, and said plurality of said skirts being constructed from a ceramic and glass fiber reinforced nylon composite.

11. The monitoring well cover of claim 10 wherein said lid further comprises threads on its side to secure said lid to said rim.

12. The monitoring well cover of claim 10 wherein said rim further comprises an L-shaped upper edge for receiving and sealing tightly with said lid.

13. The monitoring well cover of claim 10, further comprising one or more flanges of a third one of said plurality of said skirts being matingly engageable with said one or more snaps of said second one of said skirts.

\* \* \* \* \*